United States Patent
Schmidlin (10) Patent No.: US 12,187,926 B2
(45) Date of Patent: Jan. 7, 2025

(54) ADHESIVE TAPE FOR JACKETING ELONGATE ITEMS SUCH AS ESPECIALLY CABLE HARNESSES AND METHODS FOR JACKETING

(71) Applicant: tesa SE, Norderstedt (DE)

(72) Inventor: Andreas Schmidlin, Guderhandviertel (DE)

(73) Assignee: tesa SE, Norderstedt (DE)

(*) Notice: Subject to any disclaimer, the term of this patent is extended or adjusted under 35 U.S.C. 154(b) by 148 days.

(21) Appl. No.: 17/404,234

(22) Filed: Aug. 17, 2021

(65) Prior Publication Data

US 2022/0049129 A1  Feb. 17, 2022

(30) Foreign Application Priority Data

Aug. 17, 2020 (DE) ............... 10 2020 210 417.4

(51) Int. Cl.
*C09J 7/21* (2018.01)
*B32B 5/02* (2006.01)
(Continued)

(52) U.S. Cl.
CPC ............... *C09J 7/21* (2018.01); *B32B 5/022* (2013.01); *B32B 5/024* (2013.01); *B32B 5/266* (2021.05);
(Continued)

(58) Field of Classification Search
None
See application file for complete search history.

(56) References Cited

U.S. PATENT DOCUMENTS 6,432,529 B1   8/2002   Harder et al.
6,436,528 B1   8/2002   Külper et al.
(Continued)

FOREIGN PATENT DOCUMENTS

DE   4313008 A1   11/1994
DE   19807752 A1   8/1999
(Continued)

OTHER PUBLICATIONS

Product Catalog entitled: "Coroplast Adhesive Tapes—Experience and Innovation from a Single Source", www.coroplast.de/en/tapes, 2019.
(Continued)

*Primary Examiner* — Patricia L. Nordmeyer
(74) *Attorney, Agent, or Firm* — Norris McLaughlin, P.A.

(57) ABSTRACT

Adhesive tapes, especially for lengthwise jacketing of elongate items such as cable harnesses in motor vehicles and methods for producing and using said adhesive tapes are disclosed. Each adhesive tape comprises a carrier having a width $B_T$ based on the cross direction and at least one layer of adhesive applied on a bottom side of the carrier, wherein the adhesive layer bearing a second carrier, which has a lower width $B_{Schutz}$ than the width $B_T$ of the first carrier. The first carrier with the adhesive layer protrudes two-sidedly relative to the side edges of the second carrier, where the first protrusion has a width of $B_{Start}$ and the second protrusion has a width of $B_{Hülle}$. The first carrier is a woven fabric having a basis weight of 50 to 200 g/m² and the second carrier is a textile carrier having a basis weight of 300 to 1000 g/m².

13 Claims, 6 Drawing Sheets

(51) Int. Cl.
  *B32B 5/26* (2006.01)
  *B32B 7/12* (2006.01)
  *C09J 7/29* (2018.01)
  *C09J 7/38* (2018.01)

(52) U.S. Cl.
  CPC .................. *B32B 7/12* (2013.01); *C09J 7/29* (2018.01); *C09J 7/385* (2018.01); *B32B 2307/718* (2013.01); *B32B 2307/732* (2013.01); *B32B 2405/00* (2013.01); *C09J 2203/302* (2013.01); *C09J 2400/263* (2013.01)

(56) References Cited

U.S. PATENT DOCUMENTS

| | | | |
|---|---|---|---|
| 6,541,707 | B2 | 4/2003 | Külper et al. |
| 6,613,870 | B1 | 9/2003 | Harder et al. |
| 7,279,541 | B2 | 10/2007 | Centner et al. |
| 8,815,389 | B2 | 8/2014 | Külper et al. |
| 9,023,447 | B2 | 5/2015 | Siebert et al. |
| 9,613,733 | B2 | 4/2017 | Siebert et al. |
| 9,725,622 | B2 | 8/2017 | Korthals et al. |
| 10,519,344 | B2 | 12/2019 | Korthals et al. |
| 10,519,345 | B2 | 12/2019 | Korthals et al. |
| 2002/0125037 | A1 | 9/2002 | Kulper et al. |
| 2004/0097638 | A1 | 5/2004 | Centner et al. |
| 2005/0124249 | A1 | 6/2005 | Uribarri et al. |
| 2007/0173156 | A1 | 7/2007 | Kulper et al. |
| 2008/0286568 | A1* | 11/2008 | Kopf .................. C09J 7/29 428/336 |
| 2012/0231230 | A1 | 9/2012 | Siebert et al. |
| 2012/0279637 | A1 | 11/2012 | Siebert et al. |
| 2012/0279755 | A1 | 11/2012 | Korthals et al. |
| 2014/0044960 | A1 | 2/2014 | Günzler et al. |
| 2015/0013875 | A1 | 1/2015 | Siebert et al. |
| 2018/0022961 | A1* | 1/2018 | Leermann .................. C09J 7/20 428/375 |
| 2019/0284439 | A1 | 9/2019 | Kerep et al. |
| 2020/0199410 | A1 | 6/2020 | Leermann |

FOREIGN PATENT DOCUMENTS

| | | |
|---|---|---|
| DE | 10011788 A1 | 3/2002 |
| DE | 202007012475 U1 | 1/2009 |
| DE | 102011086191 A1 | 3/2013 |
| DE | 102013213726 A1 | 1/2015 |
| DE | 102018207694 A1 | 11/2019 |
| EP | 0578151 A1 | 1/1994 |
| EP | 0995783 A2 | 4/2000 |
| EP | 1308546 A1 | 5/2003 |
| EP | 1692332 A1 | 8/2006 |
| EP | 1722968 A2 | 11/2006 |
| EP | 1723210 A1 | 11/2006 |
| EP | 1848006 A1 | 10/2007 |
| EP | 1911824 A1 | 4/2008 |
| EP | 1378527 B1 | 11/2008 |
| EP | 2034576 A1 | 3/2009 |
| EP | 2497805 A1 | 9/2012 |
| EP | 2497807 A1 | 9/2012 |
| EP | 2504899 A1 | 10/2012 |
| EP | 2520628 A1 | 11/2012 |
| EP | 2520629 A1 | 11/2012 |
| EP | 2522705 A1 | 11/2012 |
| EP | 2606168 A1 | 6/2013 |
| EP | 2695926 A1 | 2/2014 |
| EP | 3540024 A1 | 11/2017 |
| EP | 3245265 A1 | 9/2019 |
| EP | 2520627 A1 | 11/2021 |
| WO | 2005056898 A1 | 6/2005 |
| WO | 2005084944 A2 | 9/2005 |
| WO | 2005085379 A1 | 9/2005 |
| WO | 2011066341 A1 | 6/2011 |
| WO | 2012024272 A1 | 2/2012 |
| WO | 2016113132 A1 | 7/2016 |

OTHER PUBLICATIONS

Protection System for Wiring Harnessses in Motor Vehicles, Volkswagen, Group Standard VW 60360-3, 2019.

\* cited by examiner

ADHESIVE TAPE FOR JACKETING ELONGATE ITEMS SUCH AS ESPECIALLY CABLE HARNESSES AND METHODS FOR JACKETING

The invention pertains to an adhesive tape for jacketing elongate items such as especially cable harnesses in motor vehicles, and to methods for jacketing.

For a considerable time adhesive tapes have been used in the industry for producing cable looms. The adhesive tapes are employed for bundling a multiplicity of electrical leads prior to installation or in the as-installed state, in order, for example, to reduce the space taken up by the bundle of leads, by bandaging, and in addition to obtain protective functions such as protection from mechanical and/or thermal stress.

Common forms of adhesive tapes include film or textile carriers, which in general have a coating of pressure-sensitive adhesives on one side. Adhesive tapes for jacketing elongate items are known from, for example, EP 1 848 006 A2, DE 10 2013 213 726 A1 and EP 2 497 805 A1.

With film-backed adhesive tapes, a certain protection against ingress of fluid is achieved; with light and voluminous adhesive tapes based on thick nonwovens or foams as carriers, damping properties are obtained; when stable, abrasion-resistant carrier materials are used, a protective function with respect to scuffing and rubbing is acquired. Particular protection against impact exposure is achieved by means of abrasion-resistant woven fabrics with additionally applied coatings.

Besides the conventional vehicles with internal combustion engines, importance is increasingly being gained by hybrid electric vehicles (HEVs) and electric cars with a battery (Battery Electric Vehicles, BEVs).

A hybrid electric vehicle is a vehicle with hybrid drive, namely an electric vehicle which is driven by at least one electrical motor and also a further energy convertor and which draws energy not only from its electrical store (rechargeable battery) but also from a fuel which is carried additionally. A fully electric vehicle is driven exclusively by a battery-operated electrical motor and so requires no fossil fuel. The rechargeable battery is charged by way of external power supply units.

In all motor vehicles, the quantity of electrical leads is increasing as a result of increased use of electrical components, while at the same time the space for installation of the harness of leads, particularly in small motor vehicles, is becoming ever smaller. The construction of electric vehicles and hybrid vehicles also requires a greater number of electrical leads. The use of electrical voltages above 42 V necessitates additional protection of the leads, which is required, beyond the normal service of the vehicle, to ensure protection in specific accident situations as well.

DE 10 2011 086 191 A1 describes a protective hose especially for pipes, which is presented as an elongated tape material and is shaped into a hose by the joining of the long edges. Durable closure of the shaped hose is accomplished by welding, by adhesive bonding, or through the use of an outer tape. Welding as a form of closure is costly and inconvenient in terms of apparatus, requiring that the two plies be brought into a close association and welded using ultrasound, for example. In the case of longitudinally extended protective hoses, this cannot be ensured at every point. The second option is that of applying an outer tape along the overlapping long edges. The combination of two plies of elongated tape material may give the combination a noticeable stiffness; when shaped into a protective hose, the latter has a tendency to open and no longer provides the protective function. The properties of the outer tape for durable and secure closure of the protective hose are not described in more detail in the specification.

Aramids are aromatic polyamides, namely polyamides which in their molecular structure include a benzene ring, containing substituents at the positions classed as meta or para according to nomenclature.

The fibres and yarns designated as meta-aramids are available under the tradename Nomex and are employed for specific purposes in personal protective equipment. The effective protection from heat and from flames, combined with a high level of wear comfort, enables these fibres and yarns to be used in protective clothing for firefighting and air travel. Known technical features of meta-aramids are that they record no significant loss in strength up to a temperature of 175° C. and that they are resistant to numerous chemicals.

The fibres and yarns designated as para-aramids are available under the tradename Kevlar or Twaron. Textiles made from these yarns display good insulating properties with respect to heat and cold, and accordingly are also employed in various sectors of personal protective equipment. In combination with other polymers, para-aramid can be used for ballistic-resistant purposes.

In the production of the textile sheets, both forms of the aramids are employed and used usually in combination with other types of yarn. In the motor vehicle industry, such textiles are occasionally employed in the form of circular-knitted or braided hoses, which have an additional coating over the full area of their entire periphery.

A self-closing, abrasion-resistant protective sleeve is described by EP 1 692 332 A1, where a knitted tapelike textile is heat-set in a circular form. Accordingly the protective hose can be opened along its lengthwise axis and is able to accept the cables. In a linear, uncurved extent, the cables are enveloped and protected. In the case of irregularly curved forms of installation in the motor vehicle, unwanted opening may occur, depending on the bending radius. In terms of the diverse diameters affecting the harness of leads, this solution requires a multiplicity of individually produced diameter versions. The selection of different polymer materials for the warp yarns and the weft yarns may result in corresponding protective properties.

The opening of a wrappable tubular protective sleeve may be improved by means of a device as described in EP 2 504 899 A1. A closing device additionally mounted on the outer sleeve, in the form of a hook-and-loop connection of a tape for knotting or of a firmly joined cable tie secures the surround against unwanted opening. The use of different materials for surround and closure make this solution very costly and inconvenient to produce; additionally, the application of these surrounds requires particular attention and increased time effort in the production of the lead harnesses.

EP 2 606 168 A1 describes a self-wrapping woven sleeve, with regions A and B which alternate in the weft direction being constructed and containing monofilament yarn and multifilament yarn, respectively. Heat treatment results in a self-sealing tubular configuration. The alternating regions A and B, however, do not appear to provide the same protective function, as a result of the use of different yarns. This solution is therefore unable to produce uniform protection at every lead harness position.

In lead harness production there are also prefabricated hoses known, which are produced individually for each cable harness diameter required. Different yarn materials may be used according to the field of application, these materials being processed to hoselike products in braiding machines or knitting machines. Frequently such materials are provided in a further processing step with impregnations or functional coatings. An impregnation, for example, may produce a stiffening effect, or a silicone coating may generate a water or oil repellencey quality. Glass silk hoses with a silicone rubber coating, for example, are known. In all cases such hose solutions are pushed according to plan onto the cable bundle before the mounting of the plug connections (with plugs, the cables no longer fit through the hose), to produce a surround which conforms as tightly as possible. This, however, is often not possible, and so free spaces are present in the hose. Constructions of this kind then take up more installation space within the vehicle. Subsequent mounting on the lead harness is impossible or near impossible to achieve with such solutions.

The high-voltage components in electrical and hybrid vehicles require special protection. DE 10 2018 207 694 A1 proposes protective textile sleeves for high-voltage components, which can be used in the form of a shrink hose to form tightly conforming protective sleeves. As well as the high-voltage electronic components, the connecting leads between these components are also in requirement of protection. This heat-activated shrink hose cannot be employed without risk for cable insulation on the lead harness.

To improve damping and increase abrasion resistance, adhesive tapes are known with carriers that consist of a plurality of layers.

EP 1 722 968 A1 discloses a highly abrasion-resistant tape for the bandaging of cable looms, especially in motor vehicles, composed of a carrier having a first outer layer A and a second outer layer B, there being located between the outer layers A and B an interlayer C, which is firmly connected to each of the outer layers A and B over the entire area of said layers. The outer layers A and B consist of a woven or knitted fabric, while the interlayer C consists of a viscoelastic adhesive, preferably a self-adhesive composition, or a double-sidedly adhesively furnished adhesive tape.

EP 1 723 210 A1 disclosed a highly abrasion-resistant and noise-damping tape for the bandaging of cable looms, this tape consisting of a carrier having a first outer layer A, connected firmly to a second layer C over the entire area of the outer layer A.

The outer layer A may be of velour, laid, woven or knitted fabric; the layer C may be a porous sheetlike structure such as a textile having an open yet stable three-dimensional structure, such as a foam or such as a foamed film.

Both outer layers have the same width and are joined to one another in each case over their entire area by means of a further layer of adhesive, without offset, so that the side edges of the layers finish flush.

Thus, EP 1 911 824 A1 describes a cable wrapping tape having a tapelike carrier in the form of an assembly of a woven fabric and a nonwoven, this carrier being furnished on at least one side over the full area with a self-adhesive, pressure-sensitive adhesive layer. The woven fabric has at least 20 warp threads per cm and at most 22 weft threads per cm. Here as well, both textile plies have the same width and are joined to one another in each case over their entire area by means of a further layer of adhesive, without offset, so that their side edges finish flush.

The two-ply construction enables the adhesive tape to reach LV 312 abrasion class E on both a 5 mm diameter mandrel and a 10 mm diameter mandrel.

A cable loom is surrounded by the adhesive tape in a wrap in the form of a helical line.

However, the two materials laminated over the full area, as described in EP 1 723 210 A1 and EP 1 911 824 A1, produce a relatively high stiffness, which has deleterious consequences in the context of spiral wrapping and which leads in particular to flagging at the tape ends.

In the context of an adhesive tape wound around a body, flagging refers to the tendency of one end of the adhesive tape to stand proud. The reason lies in a combination of the holding force of the adhesive, the stiffness of the carrier, and the diameter of the cable harness.

As a result of the full-area furnishing of the carrier with an adhesive coating, it is impossible to prevent contact between the adhesive and the cable jacketing.

This leads to high stiffness of the cable loom, since the tape is joined to the cable loom at every point by the adhesive.

When a cable loom is jacketed in a helical line with the adhesive tape, the individual turns overlap one another, and consequently at these points there are four textile plies one over the other, which likewise results in a very stiff cable loom. On account solely of the thickness of the resulting cable loom, there is a risk which cannot be ruled out, given the narrow installation conditions which currently prevail in motor vehicle construction, of the adhesive tape being damaged at sharp edges, causing the cable bundling to tear.

EP 2 034 576 A1 describes an adhesive tape composed of a carrier and of an adhesive applied thereon, this tape having a largely tack-free inside surface, by the application to the adhesive layer of a second carrier, which has a narrower width than the first carrier.

A variety of embodiments are envisaged. For instance, the second carrier may run flush at one side edge with a side edge of the first carrier, with the first carrier protruding, with the adhesive layer, relative to the other side edge of the second carrier. The first carrier may also protrude, with the adhesive layer, on both sides relative to the side edges of the second carrier, or else the first carrier protrudes with the adhesive layer on one side relative to a side edge of the second carrier, and the second carrier protrudes on the other side of the first carrier on one side relative to a side edge of the first carrier. A further possibility, moreover, is for the second carrier to consist of at least two carrier parts separate from one another, with the first carrier part having a first width and the second carrier part having a second width, the sum total of the widths of the carrier parts being less than the width of the first carrier.

In this case, a cable loom is wrapped with the above-described adhesive tape not in a helical line, as usual, but instead such that during wrapping, a longitudinal axis of the tape is aligned substantially parallel to the running direction of the cable loom. In this case, viewed in cross section, the adhesive tape is in the form of an Archimedean spiral around the cable loom. This mode of winding is referred to below as "wrapping of the cable loom".

If used in the form of a helical line, it is possible for the adhesive to come into contact with the cable jacketing, leading again to the disadvantages outlined above.

Within the motor vehicle industry, adhesive tapes for cable jacketing are tested and classified in accordance with extensive bodies of standards such as, for example, the VW 60360-3 "Protective systems for wiring harnesses in motor vehicles, Test requirements for hoses" (2019-05), the BMW GS 95008-3-1 "Protective systems for wiring harnesses in motor vehicles, Adhesive tapes, requirements, tests" or the ES-KU5T-1A303-AA rev. E (2017/06) "Harness Tape Performance Specification". These standards are referred to below in abbreviated form as the VW, BMW and Ford specifications, respectively.

The abrasion resistance of an adhesive tape and protective hose is determined by BMW and VW likewise on the basis of a defined test method. The classification of the adhesive tapes and hoses in respect of their abrasion resistance is shown in Table 1 (classification of adhesive tape abrasion resistance to BMW GS 95008-3-1) for a mandrel diameter of 5 mm; adhesive tapes and hoses are ranged according to identical abrasion classes, and hoses may additionally be tested at an increased ambient temperature (see Table 2: classification of hose abrasion resistance to VW 60360-3).

TABLE 1

Classification of adhesive tape abrasion resistance to BMW GS 95008-3-1

| Abrasion class (at RT) | Requirement |
|---|---|
| A no abrasion protection | < 100 double strokes |
| B little abrasion protection | 100 to 499 double strokes |
| C moderate abrasion protection | 500 to 999 double strokes |
| D high abrasion protection | 1000 to 4999 double strokes |
| E very high abrasion protection | 5000 to 14 999 double strokes |
| F extremely high abrasion protection | 15 000 to 29 999 double strokes |
| G abrasion protection for special applications | 30 000 double strokes |

TABLE 2

Classification of hose abrasion resistance to VW 60360-3

| | Abrasion class | | | |
|---|---|---|---|---|
| At RT | At 40° C. | At 90° C. | | Requirement |
| A | AT40 | AT90 | no abrasion protection | <100 double strokes |
| B | BT40 | BT90 | little abrasion protection | 100 to 499 double strokes |
| C | CT40 | CT90 | moderate abrasion protection | 500 to 999 double strokes |
| D | DT40 | DT90 | high abrasion protection | 1000 to 4999 double strokes |
| E | ET40 | ET90 | very high abrasion protection | 5000 to 14 999 double strokes |
| F | FT40 | FT90 | extremely high abrasion protection | 15 000 to 29 999 double strokes |
| G | GT40 | GT90 | abrasion protection for special applications | ≥30 000 double strokes |

The test element, with a length of 10 cm, is placed as a single ply onto a 5 mm thick steel mandrel, in the lengthwise direction of the product under test; in the case of an adhesive tape system which is not of the same kind over the entire area, the part tested for abrasion is that which constitutes the protective function in use. The abrading tool is a steel wire 0.45 mm in diameter, which is caused to rub centrally over the test element under a weight loading of 7 N. The numerical parameter for the abrasion properties is the number of double strokes (strokes back and forth) performed until the test element is destroyed. Measurement of the abrasion resistance permits simulation of the resistance to relatively sharp objects such as, for example, a metal edge in use.

Figure 1:
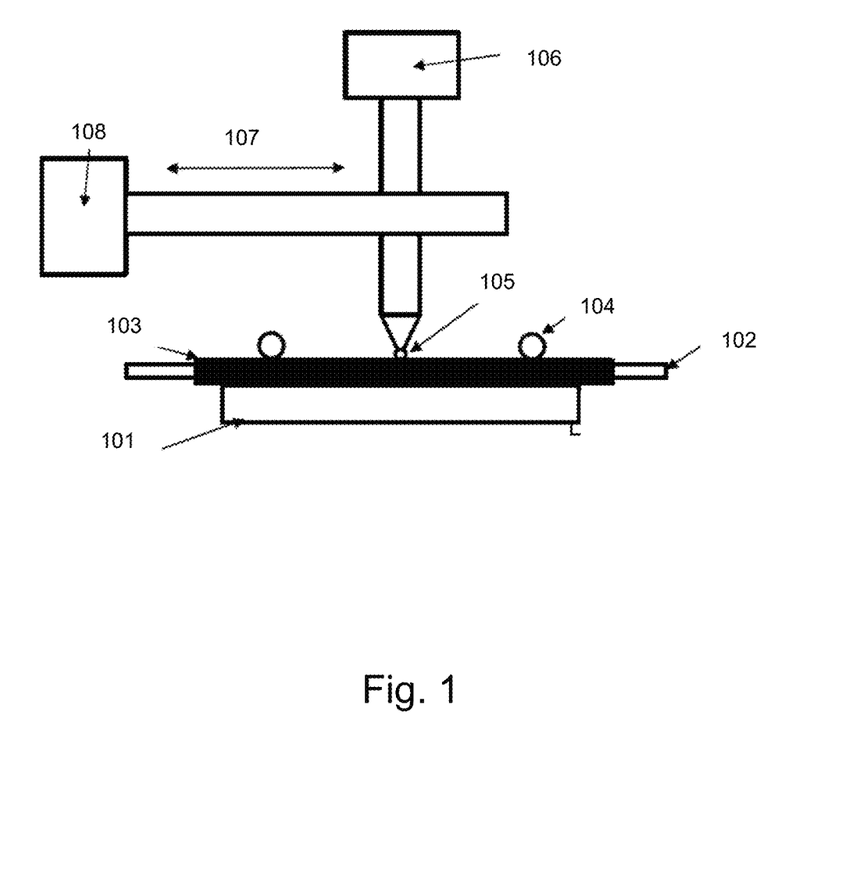
FIG. 1 shows a method of abrasion measurement.

The method of abrasion measurement is shown in FIG. 1.

The noise damping of a protective hose or adhesive tape is determined on the basis of a defined test set-up and test method in accordance with BMW, Ford and VW specifications.

In the case of the VW specification, a steel rod, mounted rotatably at one end, strikes an arched aluminium plate and, in so doing, generates a noise. The difference in the noise event between the bare steel rod and the steel rod wrapped with protective sleeve describes the degree of noise damping which a protective hose or adhesive tape is able to achieve.

Figure 2:
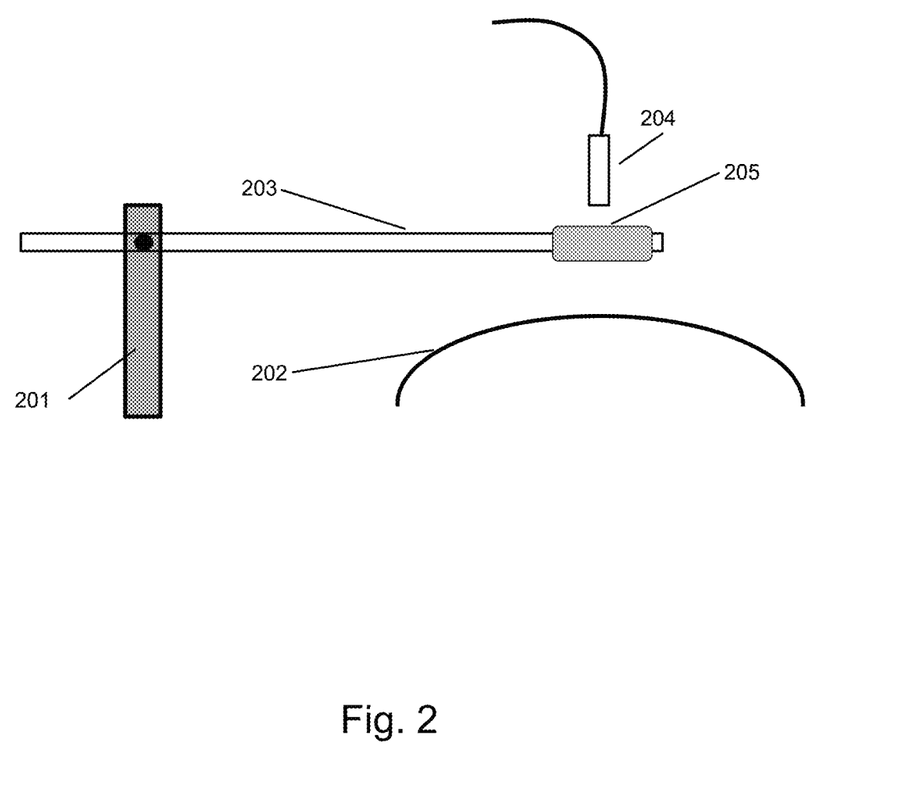
FIG. 2 shows a measurement method for noise damping according to the BMW and Ford standards.

The measurement method for noise damping according to the BMW and Ford standards is set out in detail below, in connection with FIG. 2.

With this measurement technique, a defined steel rod 203 (diameter 8 mm, lever length at 220 mm) is provided with a test adhesive tape 205 and caused to drop—released from the blocking mechanism 205—from a height of 20 mm with a force of 0.16 N onto an aluminium plate 204. The dimensions of the aluminium plate in the undeformed state are 350×190×0.3 [mm], and the plate is arranged in the form of a half-barrel beneath the test element 205, to produce a width of 290 mm.

The resultant noise is detected using a microphone 204, which is located 50 mm above the point of impact, and a commercial sound meter—model 2239 from Bruel & Kjaer, for example—in the form of the sound pressure level (Lsp) with the frequency rating A (frequency range from 20 to 12 500 Hz, for example) and the time rating S (slow).

The damping is reported as the difference between the control value with the unwrapped steel rod and the respective value measured for the test element, in dB(A).

TABLE 3

Classification of noise damping according to different specifications

| Noise damping value measured | Noise damping class according to BMW and VW specification | Noise damping class according to Ford specification |
|---|---|---|
| 0 to 2 dB(A) | A no noise damping | 0 |
| >2 to ≤5 dB(A) | B low noise damping | 1 |
| >5 to ≤10 dB(A) | C moderate noise damping | 2 |
| >10 to ≤15 dB(A) | D high noise damping | 3 |
| >15 dB(A) | E very high noise damping | 4 |

Figure 3:
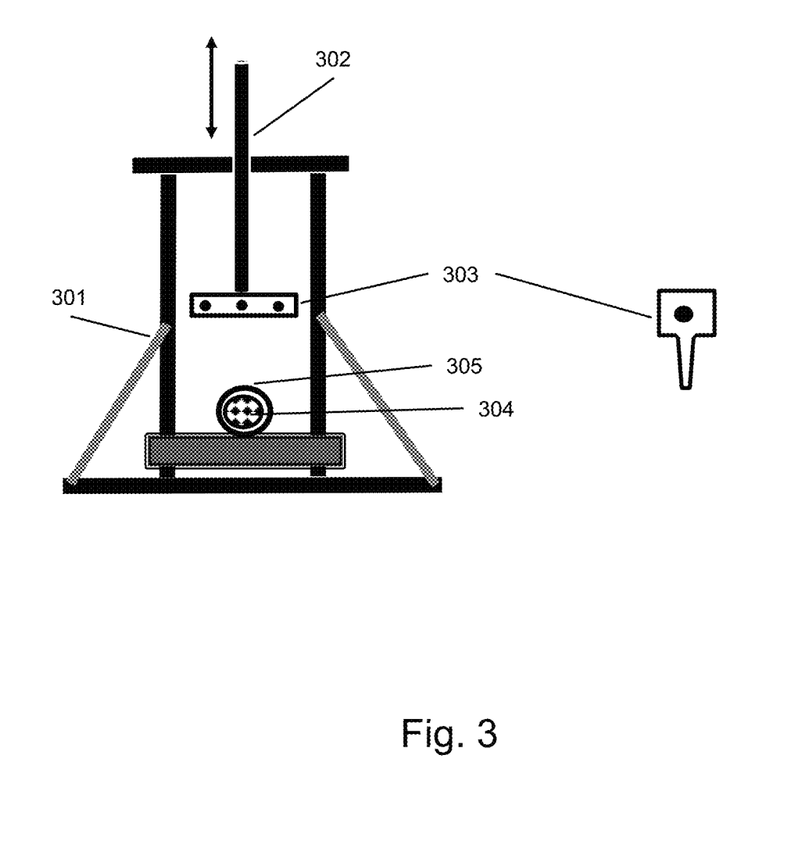
FIG. 3 shows a dropping tower test in accordance with standard VW 60360-3.

The testing of adhesive tapes and protective hoses in respect of heightened mechanical requirements is described in standard VW 60360-3 in the form of the dropping tower test. The dropping tower test is shown in FIG. 3. The test apparatus consists of a base plate with a dropping tower mounted over it, capable of guiding a dropping tool of defined geometric shape onto the test specimen. The dropping body, with a total mass of 10 kg, falls largely without friction onto the test specimen; the dropping velocity prior to impact defines the dropping energy of the test specimen. Test specimens for use are shielded and unshielded wires having a diameter of 16 to 35 mm², which are provided with the protective system under test. A test voltage is applied to the inner wire, the shielding and the dropping tool, to detect electrical contacts during the test. Electrical contact indicates the damage to the test cable occurring at the testing energy used.

The maximum attainable dropping energy without measurable damage to the test cable determines the classification of the protective surround, according to Table 4:

TABLE 4

Classification of energy classes to VW 60360-3

| Dropping test class/ classification | Dropping energy class Dropping tool 1 | Dropping energy class Dropping tool 2 |
|---|---|---|
| A | 5 J ± 10% | 5 J ± 10% |
| B | 10 J ± 10% | 10 J ± 10% |

TABLE 4-continued

Classification of energy classes to VW 60360-3

| Dropping test class/ classification | Dropping energy class Dropping tool 1 | Dropping energy class Dropping tool 2 |
|---|---|---|
| C | 15 J ± 10% | 15 J ± 10% |
| D | 25 J ± 10% | 25 J ± 10% |
| E | 50 J ± 10% | 50 J ± 10% |
| F | 75 J ± 10% | 75 J ± 10% |
| G | >75 J | >75 J |

The testing of the ageing properties is intended to simulate and ensure the behaviour of the bundling by the adhesive tape solution over the entire period of vehicle usage.

The BMW standard describes the production of test specimens using wiring from the different temperature classes which are defined in the vehicle. Accordingly, for the sustained service temperatures of 105° C., 125° C. and 150° C., reference wiring is described that is intended for use for the test in this temperature class. Using the adhesive tape/ longitudinal bandaging under test, test specimens with a length of 500 mm and a bundled length of 400 mm are produced. When using longitudinal bandaging, the diameter of the test specimens is to be adapted to the width of the adhesive tape that is present.

The test specimens are bent in a U-shape at the maximum sustained service temperature, and additionally, in the case of the lower temperature classes, are stored in an oven with natural aeration for a time of 3000 h. Every 500 hours, one test specimen is removed and tested for existing properties. The test specimen shall not show any cracks, melting or other visible damage, and shall ensure reliable bundling of the cables. In a bending test around a mandrel with a diameter 4 times that of the test specimen, the specimen must not lead to rupture or splitting of the bundling.

As well as the long-term ageing test, a short-term ageing test is described, which in the case of elevated temperature storage is able to simulate the long-term ageing described above. Test specimens are produced with the adhesive tape/longitudinal bandaging under test, on inert, temperature-stable wiring, these specimens exhibiting a total length of 500 mm and a testing length of 400 mm. Temperature storage takes place in an oven with natural aeration at a temperature situated 25° C. above the temperature class to be tested. After a storage time of 240 hours, the test specimens are removed and tested for existing properties. The test specimen shall not show any cracks, melting or other visible damage, and shall ensure reliable bundling of the cables. In a bending test around a mandrel with a diameter 4 times that of the test specimen, the specimen must not lead to rupture or splitting of the bundling.

The Ford standard describes a long-term temperature storage, with reference to standard SAE J2192. The temperature storage takes place over a period of 3000 hours in the target temperature class for the adhesive tape/longitudinal bandaging. The test specimens use cables of the same or a higher temperature class, which are enveloped over a minimum length of 300 mm with the material under test. In the case of longitudinal bandaging, the number of wires in the test specimen shall be adapted to the width of the longitudinal bandaging. The test specimens are stored hanging in an oven with natural aeration for the period of 3000 hours.

Every 500 hours, one test specimen is removed and tested for existing properties. The test specimen shall not show any cracks, melting or other visible damage, and shall ensure reliable bundling of the cables. In a bending test around a mandrel the test specimen must not lead to rupture or splitting of the bundling. The test intervals at 500 to 1500 hours are for bending around a mandrel with four times the diameter of the test specimen, and test intervals of 2000 to 3000 hours are for bending around a mandrel with ten times the diameter of the test specimen.

Measurement of the suppleness is a key quality feature of textiles, leather, paper and plastics having flexurally slack properties. The testing of the bending force by the softometer method serves to determine the softness or stiffness of the sheetlike materials in a comparable way, under specified conditions.

For determining the bending force on an expanse of textile, a sample specimen measuring 75×50 mm is punched out. A rotatably mounted sample holder comprising two parallel plates fixes the punched out sample over an area of 50×50 mm. The sample holder with the sample is pivoted against a force sensor, so that the portion of the sample not clamped in, with the length of 15 mm, is bent by 30°. The bending force needed in this position is measured after a measuring time of 10 s as the bending force in the unit mN.

To describe the textile properties, a sample can be punched out in machine and cross directions and also, if the application requires it, in a diagonal direction, for the measurement. The extension in the direction of the sample side 75 mm long here also describes the bending direction which is to be assessed.

It is an object of the invention to achieve a marked improvement relative to the prior art and to provide an adhesive tape which in the form of longitudinal bandaging provides particularly high protection of lead harnesses. This protective function with respect to scuffing, rubbing and impact effects is intended to provide particular protection to the high-voltage regions on the lead harness. The adhesive tape is to realise two contradictory properties in a perfect way: first a high mechanical protection against notching effect, and secondly the capacity to be wrapped around thin items in spite of the stiffness associated with the high mechanical protection.

This object is achieved by means of an adhesive tape as recorded in the main claim. The dependent claims provide advantageous developments of the adhesive tape and methods for the use of the adhesive tape.

The invention relates accordingly to an adhesive tape, especially for lengthwise jacketing of elongate items such as cable harnesses in a motor vehicle, comprising a carrier having a top side and a bottom side, where the carrier, based on the cross direction, has a width $B_T$, and at least one layer of adhesive applied on the bottom side of the carrier, where the adhesive layer bears a second carrier, which has a lower width $B_{Schutz}$ than the width $B_T$ of the first carrier, the first carrier with the adhesive layer protrudes two-sidedly relative to the side edges of the second carrier, where the first protrusion has a width of $B_{Start}$ and the second protrusion has a width of $B_{Hülle}$, the first carrier is a woven fabric and the second carrier is a textile carrier selected from the group of woven double fabric, flat knit fabric, needle-punched nonwoven fabric and also drawn-loop spacer knit or formed-loop spacer knit, and the first carrier has a basis weight of 50 g/m² to 200 g/m² and the second carrier has a basis weight of 300 to 1000 g/m².

The adhesive tape of the invention preferably consists substantially of the three layers; further functional layers, optimizing the properties of the first or second carrier, may be present on said first or second carrier. These layers are defined as a constituent of the respective layer.

For the individual sections, the following widths have proved to be particularly advantageous: $B_{Start}$ has a width of 3 to 20 mm, preferably 5 to 10 mm.

$B_{Schutz}$ has a width of 50 to 200 mm, preferably 80 to 160 mm, or a width of 100 to 400 mm, preferably 160 to 320 mm, if the item is to be wrapped with two plies.

$B_{Hülle}$ has a width of 50 to 200 mm, preferably 80 to 160 mm.

The widths of the individual sections are selected in principle so that the adhesive tape can be used very effectively.

During the jacketing operation, the section $B_{Start}$ serves to secure the adhesive tape gently on the item, so that it does not slip during the ongoing wrapping operation.

The section $B_{Schutz}$ envelopes the item to be wrapped, i.e. usually the cable loom, with cable looms having diameters of 10 mm up to 40 or 50 mm being wrapped. The width is guided in particular as well by the consideration of whether the item is to be wrapped in one or two plies by the second carrier.

The section $B_{Hülle}$ serves to secure the adhesive tape reliably. In order to ensure reliable securement, it may be advantageous if the width of this section is such that the entire item is wrapped completely one further time.

The adhesively furnished woven fabric carrier carries the second carrier and provides the secure surrounding and the durably adhesive closure of the resultant longitudinal bandaging, also called surround.

In order to ensure the proper application of the adhesive tape particularly to cable looms, there may be at least one marker line extending in the longitudinal direction on the top side of the first carrier. Two marker lines are preferred. These marker lines differ visually and/or haptically from the surface surrounding them.

The second carrier is intended to protect the entire periphery of the lead harness, but is not visible during wrapping, since the first carrier lies on the outside of the adhesive tape. A first marker line indicates the start of the second carrier. After the enveloping of the lead harness, the end of the second carrier is to extend over the first marker line (start), to allow an all-round protective layer to be produced.

The position of the second marker line (end) is adapted to the width of the second carrier. If the second carrier is to produce a complete envelopment, the stripe should be positioned near to the side edge of the second carrier. If the second marker line (end) is no longer visible after wrapping, sufficient envelopment for the lead harness diameter has been applied. If a lead harness with a large diameter is wrapped with the adhesive tape, the marker line (end) remains externally visible. If a lead harness of relatively small diameter is wrapped with the adhesive tape, the marker line (end) is not visible, but more adhesive tape has been used for wrapping than is arithmetically necessary. Protection is ensured.

The marking is applied to the carrier, by printing, for example. Alternatively or additionally, however, it is possible for the marking to be incorporated in the first carrier. For instance, the marking may be realised as a warp thread incorporated by weaving, so to speak.

EP 3 245 265 A1 describes the use of a marker line of this kind on an adhesive tape.

According to one preferred embodiment of the invention, therefore, there is at least one marker line extending in longitudinal direction on the top side of the first carrier; preferably there are two marker lines, which in particular are arranged above the long edges of the second carrier.

The first carrier is a woven fabric.

Particularly preferred woven fabrics have the following construction:
- the warp thread count is 10 to 60/cm
- the weft thread count is 10 to 40/cm
- the warp threads possess a yarn weight between 40 and 500 dtex, more particularly between 40 and 400, more particularly still between 44 and 470 dtex, more particularly still between 44 and 330 dtex, very preferably of 167 dtex
- the weft threads possess a yarn weight between 40 and 660 dtex, more particularly between 44 and 470 dtex, more particularly still between 44 and 400 dtex, very preferably of 167 dtex According to another advantageous embodiment of the invention, the thread count in the warp is 40 to 50/cm, preferably 44/cm.

According to another advantageous embodiment of the invention, the thread count in the weft is 20 to 35/cm, preferably 25 to 29/cm, more preferably 26 to 29/cm.

Preferably both features are realised simultaneously in one woven fabric.

In a variant of another advantageous embodiment of the invention, the thread count in the warp is 20 to 30/cm, preferably 21/cm, and/or the thread count in the weft is 20 to 30/cm, preferably 21/cm.

According to another advantageous embodiment of the invention, the woven fabric is a woven polyester fabric, more particularly a woven polyethylene terephthalate fabric. Other variants may comprise woven polyamide fabrics or mixed woven fabrics of polyester and polyamide.

More preferably the thickness of the woven fabric is not more than 300 μm, more preferably 170 to 230 μm, very preferably 190 to 210 μm.

According to another advantageous embodiment of the invention, the first carrier has a basis weight of 70 g/m² to 200 g/m², preferably 100 to 190 g/m², more preferably 100 to 150 g/m².

The first carrier, the top side of which can be seen after wrapping, may have a colouration in order to identify the adhesive tape:
- orange for voltages >60 volts,
- blue for voltages >48 volts, and
- other colours if determined by statutory provisions.

The adhesive coatweight, based on the carrier area, is preferably between 40 and 160 g/m², more preferably between 60 and 130 g/m², more preferably still between 80 and 100 g/m².

The second carrier is a textile carrier selected from the group of woven double fabric, flat knit fabric or needle-punched nonwoven fabric. The group from which the second carrier may be selected further comprises drawn-loop spacer knit or formed-loop spacer knit as well.

Preferably the thickness of the second carrier is not more than 4000 μm, more preferably 1000 to 3000 μm, very preferably 1500 to 2700 μm.

According to another advantageous embodiment of the invention, the second carrier has a basis weight of 350 g/m² to 850 g/m², preferably 400 to 800 g/m².

The following particularly suitable carriers are stated illustratively, with their basis weights and the associated thicknesses:

| Material | Basis weight [g] | Thickness [μm] |
|---|---|---|
| Formed-loop spacer knit | 523 | 2430 |
| Flat knit fabric I | 875 | 1475 |
| Flat knit fabric II | 875 | 1680 |
| Needlefelt | 400 | 1680 |
| Needlefelt | 600 | 2650 |
| Needlefelt | 800 | 3450 |

Drawn-loop spacer knits possess two separate knitted fabric areas. The two knitted fabric layers are joined by separate threads, usually monofilaments, which do not form stitches, but instead are bound in alternately on the needles of the front and rear needle carrier, as loops. Owing to the resultant 3D structure, the drawn-loop spacer knits are also called 3D textiles. The special construction produces a permanent damping zone between the joined fabric areas, which is able to diminish or neutralize an impact event, in a manner comparable to that of a car bumper. Textiles of this kind may be produced, for example, on circular knitting machines from Mayer & Cie.

Formed-loop spacer knits are produced on double Raschel machines with two needle bars in one operation. On each rotation of the machine, the stitches on one needle bar are formed simultaneously on all the needles. The standard production of formed-loop spacer knits may use up to seven thread systems on the double Raschel machines. The multiplicity of thread materials used simultaneously results in diverse construction options.

Standard weaves preferred for the production of closed outer faces are tricot, linen or twill weaves. The spacer thread used is generally a monofilament. This space-imparting monofil thread is usually placed crosswise between the outer textile faces, with a crossing angle of approximately 45°. This ensures effective displacement resistance of the outer textile faces relative to one another, and prevents the structure tipping under compressive load. The thickness of the formed-loop spacer knits produced is to be tailored to the intended use, through a corresponding machine setting.

Particular suitability is possessed by needlefelt webs. With the needlefelt web, a tuft of fibres is made into a sheetlike structure by means of needles provided with barbs. By alternate introduction and withdrawal of the needles, the material is consolidated on a needle bar, with the individual fibres interloping to form a firm sheetlike structure. The number and configuration of the needling points (needle shape, penetration depth, double-sided needling) determine the thickness and strength of the fibre structures, which in general are lightweight, air-permeable and elastic. The needles are usually 3 or 3.5 inches long in each case, and possess a plurality of barbs. The thickness of the needle shank is guided by the linear density of the fibres used. The needles enter the web up to 1000 times a minute. In this process, the barbs cause the slightly crimped fibres to hook together.

The needling density is advantageously 1 needle/cm² laid staple fibre scrim to 50 needles/cm² laid staple fibre scrim.

In contrast to the reinforced woven fabrics, with which two or more thread systems are bound into a woven fabric ply, woven double fabrics are fabrics which consist of two independent woven fabrics one above the other, these fabrics being connected firmly to one another during the weaving operation. Their production thus requires two warp thread systems and two weft thread systems, which form the two woven fabric plies. The plies are joined as follows:

Tying on: joining of weft of the lower fabric to warp of the upper fabric.

Tying off: joining of warp of the lower fabric to weft of the upper fabric.

Tying weft or tying warp: a further thread system joins the two fabrics in the form of weft or warp.

EP 1 308 546 A1 describes a method for weaving a double fabric.

The second carrier consists in particular of polyester, more particularly of polyethylene terephthalate. Other variants may be polyamide or mixtures of polyester and polyamide.

With polyamide for the first and second carriers it is possible to achieve high abrasion protection, but the temperature class usually attains only class 3.

The direction of the flow of material in the machine in which a woven or nonwoven fabric or a fabric in general is produced is referred to as the machine direction or running direction, while the direction at a right angle thereto is referred to, correspondingly, as the transverse or cross direction.

In order to enable particularly simple operation for the user, the perforations are aligned at right angles to the running direction of the adhesive tape and/or are arranged at regular intervals.

The perforations can be produced in a particularly advantageous way either discontinuously, using flat dies or cross-running perforating wheels, or continuously, using rotary systems such as spike rollers or punch rollers, optionally with the use of a counter-roller (Vulkollan roller) forming the counter-wheel during cutting.

Further possibilities include cutting technologies which are controlled to operate intermittently, such as the use of lasers, ultrasound or high-pressure waterjets, for example, and so on. Where, in the case of laser cutting or ultrasound cutting, some of the energy is introduced into the carrier material in the form of heat, it is possible to melt the fibres in the cutting region, thereby very largely preventing disruptive fraying, and producing sharply contoured cut edges. Latter methods are also suitable for obtaining specific cut-edge geometries, such as concave or convex cut edges, for example.

Starting materials for the carrier material for the two carriers of the adhesive tape are more particularly (man-made) fibres (staple fibre or continuous filament) made from synthetic polymers, also called synthetic fibres, made from polyester, polyamide, polyimide or aramid. Yarns fabricated from the specified fibres are likewise suitable, furthermore.

In the case of woven fabrics, individual threads may be produced from a blend yarn. Generally speaking, however, the warp threads and the weft threads are each formed of a single kind.

The yarns or threads of the woven fabrics may take the form of filaments. For the purposes of this invention, a filament refers to a bundle of parallel individual linear fibres/filaments, often also referred to in the literature as a multifilament. This fibre bundle may optionally be given inherent strengthening by torsion, and is then referred to as spun or twisted filaments. Alternatively the fibre bundle can be given inherent strengthening by entangling using compressed air or waterjets. In the text below, for all of these embodiments, only the term "filament" is used, in a generalising way.

The filament may be texturized or smooth and may have point strengthening or no strengthening.

Texturizing refers generally to a procedure in which the threads are permanently crimped. The crimping produces loops which raise the elastic stretchability and also the abrasion resistance.

Preferred material for the carrier comprises polyamide, more preferably polyesters such as polyethylene terephthalate, on account of the outstanding ageing stability and the outstanding media resistance with respect to chemicals and service media such as oil, petrol, antifreeze, and the like. Polyester, moreover, has the advantages that it leads to a very abrasion-resistant and temperature-stable carrier, this being particularly important for the specific end use for the bundling of cables in motor vehicles and, for example, in the engine compartment.

For the adhesive on the first carrier it is possible to employ all known adhesive systems. Besides adhesives based on natural or synthetic rubber, it is possible in particular to use silicone adhesives and also polyacrylate adhesives.

The adhesive is preferably a pressure-sensitive adhesive (PSA), in other words an adhesive which even under relatively weak applied pressure allows durable bonding to virtually all substrates and which after use can be detached from the substrate again substantially without residue. A PSA has a permanently pressure-sensitive adhesive effect at room temperature, in other words possessing sufficiently low viscosity and a high tack, and so the surface of the bonding substrate in question is wetted even with low applied pressure. The bondability of the adhesive derives from its adhesive properties, and the redetachability from its cohesive properties.

PSAs may be viewed as liquids of extremely high viscosity with an elastic component. PSAs accordingly have particular, characteristic viscoelastic properties which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, in dependence not only on the precise composition, the structure and the degree of crosslinking of the respective PSA, but also on the rate and duration of the deformation, and on the temperature.

The proportional viscous flow is necessary for the attainment of adhesion. Only the viscous components, brought about by macromolecules with relatively high mobility, permit effective wetting and effective flow onto the substrate where bonding is to take place. A high viscous flow component results in high tack (also referred to as surface stickiness) and hence often also in a high peel adhesion. Highly crosslinked systems, crystalline polymers or polymers with glasslike solidification lack flowable components and are therefore in general devoid of pressure-sensitive adhesiveness or at least possess only little pressure-sensitive adhesiveness.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. They enable an adhesive bond to withstand a long-term load acting on it, in the form of a long-term shearing load, for example, to a sufficient extent over a relatively long time period.

One adhesive which has shown itself to be particularly suitable is a low molecular mass, pressure-sensitive, acrylate hotmelt adhesive, as stocked under the acResin UV name by BASF. This adhesive, with a low K value, acquires its practical properties by means of a concluding crosslinking operation initiated chemically by radiation.

Other outstandingly suitable adhesives are described in EP 3 540 024 A1, EP 2 520 627 A1, EP 2 522 705 A1, EP 2 520 628 A1, EP 2 695 926 A1 and EP 2 520 629 A1.

Particularly preferred is a PSA in the form of a dried polymer dispersion, the polymer having been synthesized from:
(a) 95.0 to 100.0 wt % of n-butyl acrylate and/or 2-ethylhexyl acrylate
(b) 0.0 to 5.0 wt % of an ethylenically unsaturated monomer having an acid or acid anhydride function.

The polymer consists preferably of 95.0 to 99.5 wt % of n-butyl acrylate and/or 2-ethylhexyl acrylate and 0.5 to 5 wt % of an ethylenically unsaturated monomer having an acid or acid anhydride function, more preferably of 97.0 or 98.0 wt % to 99.0 wt % of n-butyl acrylate and/or 2-ethylhexyl acrylate and 1.0 to 2.0 wt % or 3 wt % of an ethylenically unsaturated monomer having an acid or acid anhydride function.

Besides the acrylate polymers recited, and besides any residual monomers present, the PSA may additionally be admixed with tackifiers and/or adjuvants such as light stabilizers or ageing inhibitors.

In particular there are no further polymers such as elastomers present in the PSA, meaning that the polymers of the PSA consist only of the monomers (a) and (b) in the proportions indicated.

The monomer (a) is preferably formed by n-butyl acrylate.

Examples of monomers contemplated as (b) advantageously include acrylic acid, methacrylic acid, itaconic acid, maleic acid, fumaric acid and/or maleic anhydride.

Preference is given to (meth)acrylic acid of the formula I, where $R^3$ is H or $CH_3$; preference is given optionally to using the mixture of acrylic acid or methacrylic acid. Acrylic acid is particularly preferred.

According to one particularly preferred variant, the composition of the polymer is as follows:
(a) 95.0 to 100.0 wt %, preferably 95.0 to 99.5 wt %, more preferably 98.0 to 99.0 wt % of n-butyl acrylate and
(b) 0.0 to 5.0 wt %, preferably 0.5 to 5.0 wt %, more preferably 1.0 to 2.0 wt % of acrylic acid.

The polymer dispersion is prepared by the process of emulsion polymerization of the stated components. Descriptions of this process can be found for example in "Emulsion Polymerization and Emulsion Polymers" by Peter A. Lovell and Mohamed S. El-Aasser—Wiley-VCH 1997—ISBN 0-471-96746-7 or in EP 1 378 527 B1.

During the polymerization it cannot be ruled out that not all of the monomers undergo reaction to form polymers. It is obvious here that the residual monomer content is to be as small as possible.

Preference is given to providing adhesives comprising the polymer dispersion with a residual monomer content of less than or equal to 1 wt %, more particularly less than or equal to 0.5 wt % (based on the mass of the dried polymer dispersion).

A "tackifier resin" is understood, in accordance with the general understanding of the skilled person, to refer to an oligomeric or polymeric resin which raises the autoadhesion (the tack, the inherent adhesiveness) of the PSA by comparison with the PSA that is otherwise identical but contains no tackifier resin.

The use of tackifiers for boosting the peel adhesion values of PSAs is known in principle. This effect also comes about if the adhesive is admixed with up to 15 parts by weight (corresponding to <15 parts by weight), or 5 to 15 parts by weight, of tackifier (based on the mass of the dried polymer dispersion). Preference is given to adding 5 to 12, more preferably 6 to 10, parts by weight of tackifier (based on the mass of the dried polymer dispersion).

Suitability as tackifiers, also referred to as tackifier resins, is possessed in principle by all known classes of compound. Tackifiers are, for example, hydrocarbon resins (for example polymers based on unsaturated $C_5$ or $C_9$ monomers), terpenephenolic resins, polyterpene resins based on raw materials such as, for example, α- or ß-pinene, aromatic resins such as coumarone-indene resins or resins based on styrene or α-methylstyrene such as rosin and its derivatives, for example disproportionated, dimerized or esterified rosin, for example reaction products with glycol, glycerol or pentaerythritol, to name but a few. Preferred resins are those without readily oxidizable double bonds, such as terpenephenolic resins, aromatic resins and, very preferably, resins produced by hydrogenation, such as, for example, hydrogenated aromatic resins, hydrogenated polycyclopentadiene resins, hydrogenated rosin derivatives or hydrogenated polyterpene resins.

Resins based on terpene phenols and rosin esters are preferred. Likewise preferred are tackifier resins having a softening point of more than 80° C. according to ASTM E28-99 (2009). Particularly preferred are resins based on terpene phenols and rosin esters having a softening point of more than 90° C. according to ASTM E28-99 (2009). The resins are usefully employed in dispersion form. In that way they can easily be mixed in finely divided form with the polymer dispersion.

Particularly preferred is the variant wherein no tackifier resins at all have been added to the PSA.

Surprisingly and unforeseeably for the skilled person, the absence of tackifier resins from the adhesive tape does not—as the skilled person would have expected—result in inadequate peel adhesion. Surprisingly, furthermore, the flagging behaviour as well is not poorer.

In particular, the PSA is not admixed with the following substances:
hydrocarbon resins (for example polymers based on unsaturated $C_5$ or $C_9$ monomers)
terpenephenolic resins
polyterpene resins based on raw materials such as, for example, α- or β-pinene
aromatic resins such as coumarone-indene resins or resins based on styrene or α-methylstyrene such as rosin and its derivatives, for example disproportionated, dimerized or esterified rosin, for example reaction products with glycol, glycerol or pentaerythritol.

On account of their particular suitability as an adhesive for adhesive tapes of automotive cable harnesses, in respect of freedom from fogging, and also of outstanding compatibility with both PVC core insulations and also PVC-free core insulations, preference is given to solvent-free acrylate hotmelt compounds, of the kind described in more detail in DE 198 07 752 A1 and also in DE 100 11 788 A1.

A suitable adhesive is an acrylate hotmelt-based adhesive having a K value of at least 20, more particularly greater than 30 (measured in each case in 1 wt % solution in toluene, 25° C.) and obtainable by concentrating a solution of such an adhesive to form a system which can be processed as a hotmelt.

The concentrating process may take place in appropriately equipped vessels or extruders; especially in the case of accompanying degassing, a venting extruder is preferred.

One such adhesive is set out in DE 43 13 008 C2. In an intermediate step, the solvent is removed entirely from these acrylate adhesives produced in this way.

The K value here is determined in particular in analogy to DIN 53 726.

Additionally here, further volatile constituents are removed. After coating from the melt, these adhesives have only small residual fractions of volatile constituents. Hence it is possible to adopt all of the monomers/formulas that are claimed in the patent referred to above.

The solution of the adhesive may comprise 5 to 80 wt %, more particularly 30 to 70 wt %, of solvents.

Preference is given to using commercial solvents, particularly low-boiling hydrocarbons, ketones, alcohols and/or esters.

It is preferred, moreover, to use single-screw, twin-screw or multi-screw extruders having one or, in particular, two or more venting units.

The acrylate hotmelt-based adhesive may have had benzoin derivatives incorporated into it by copolymerization, examples being benzoin acrylate or benzoin methacrylate, acrylic or methacrylic esters. Benzoin derivatives of these kinds are described in EP 0 578 151 A.

The acrylate hotmelt-based adhesive may be UV-crosslinked. Other modes of crosslinking are also possible, however, an example being electron beam crosslinking.

In another preferred embodiment, self-adhesive compounds used are copolymers of (meth)acrylic acid and esters thereof having 1 to 25 carbons, maleic, fumaric and/or itaconic acid and/or their esters, substituted (meth)acrylamides, maleic anhydride, and other vinyl compounds, such as vinyl esters, more particularly vinyl acetate, vinyl alcohols and/or vinyl ethers.

The residual solvent content ought to be below 1 wt %.

One adhesive which is found to be particularly suitable is a low molecular mass, pressure-sensitive, acrylate hotmelt adhesive, of the kind stocked under the name acResin UV or Acronal®, especially acResin 258UV, by BASF. This adhesive with a low K value acquires its practical properties as a result of a concluding crosslinking procedure initiated chemically by radiation.

The adhesive coating likewise preferably consists of an adhesive based on synthetic rubber, more particularly, in fact, an adhesive comprising at least one vinyl aromatic block copolymer and at least one tackifying resin. Typical concentrations of use for the block copolymer lie in a concentration in the range between 30 wt % and 70 wt %, more particularly in the range between 35 wt % and 55 wt %.

Further polymers which may be present are those based on pure hydrocarbons such as, for example, unsaturated polydienes, such as natural or synthetically produced polyisoprene or polybutadiene, chemically substantially saturated elastomers such as, for example, saturated ethylene-propylene copolymers, α-olefin copolymers, polyisobutylene, butyl rubber, ethylene-propylene rubber, and also chemically functionalized hydrocarbons such as, for example, halogen-containing, acrylate-containing or vinyl ether-containing polyolefins, which may replace up to half of the vinyl aromatic-containing block copolymers.

Serving as tackifiers are tackifier resins which are compatible with the elastomer block of the styrene block copolymers.

Plasticizing agents typically employed are those such as, for example, liquid resins, plasticizer oils or low molecular mass liquid polymers such as, for example, low molecular mass polyisobutylenes having molar masses <1500 g/mol (number average) or liquid EPDM grades.

To all the stated types of adhesives it is possible to add further additives in the form of light stabilizers such as, for example, UV absorbers, sterically hindered amines, antiozonants, metal deactivators, processing assistants, and end-block-reinforcing resins.

Fillers such as, for example silicon dioxide, glass (ground or in the form of spheres, as solid or hollow spheres), microballoons, aluminium oxides, zinc oxides, calcium carbonates, titanium dioxides, carbon blacks, silicates and chalk, to name but a few, and also colour pigments and dyes, and also optical brighteners, may likewise be used.

It is common to add primary and secondary antioxidants to PSAs in order to improve their ageing stability. Primary antioxidants react with oxy and peroxy radicals, which may form in the presence of oxygen, and react with them to form less reactive compounds. Secondary antioxidants reduce hydroperoxides, for example, into alcohols. There is a known synergistic effect between primary and secondary ageing inhibitors, and so the protective effect of a mixture is frequently greater than the sum of the two individual effects.

If the adhesive tape described is to be of low flammability, this quality can be achieved by adding flame retardants to the carrier and/or to the adhesive. These retardants may be organobromine compounds, if required with synergists such as antimony trioxide, although, with regard to the absence of halogen from the adhesive tape, preference will be given to using red phosphorus, organophosphorus compounds, mineral compounds or intumescent compounds such as ammonium polyphosphate, alone or in conjunction with synergists.

The PSAs may be produced and processed from solution, from dispersion and also from the melt. Preferred production and processing methods take place from the melt. For the latter case, suitable production operations encompass both batch processes and continuous processes.

The adhesive may be applied in a longitudinal direction of the adhesive tape, in the form of a stripe, the width of the stripe being lower than that of the first carrier.

Depending on the particular utility, there may also be a plurality of parallel stripes of the adhesive coated on the carrier material.

The position of the stripe on the carrier is freely selectable, with preference being given to an arrangement directly at one of the edges of the carrier.

The adhesive is preferably applied over the full area on the carrier.

The general expression "adhesive tape" in the context of this invention encompasses all sheetlike structures such as two-dimensionally extended films or film sections, tapes with extended length and limited width, tape sections and the like, and also, lastly, diecuts or labels.

The adhesive tape therefore has a longitudinal extent and a latitudinal extent. The adhesive tape also has a thickness, extending perpendicularly to both extents, with the latitudinal extent and longitudinal extent being multiple times greater than the thickness. The thickness is very largely the same, preferably exactly the same, over the entire superficial extent of the adhesive tape as defined by length and width.

The adhesive tape takes the form in particular of a sheet web. A sheet web is an object whose length is multiple times greater than the width, with the width being approximately and preferably exactly the same along the entire length.

The adhesive tape may be produced in the form of a roll, in other words rolled up onto itself in the form of an Archimedean spiral.

Applied to the reverse face of the adhesive tape may be a reverse-face varnish (functional layer), in order to exert a favourable influence on the unwind properties of the adhesive tape wound into the Archimedean spiral. This reverse-face varnish may for this purpose be furnished with silicone compounds or fluorosilicone compounds and also with polyvinylstearylcarbamate, polyethyleniminestearylcarbamide or organofluorine compounds as adhesive substances.

The wrapping of a cable loom with the adhesive tape described takes place in this case such that, during wrapping, a longitudinal axis of the tape is oriented substantially parallel to the direction in which the cable loom extends. As viewed in cross section, the adhesive tape here is in the form of an Archimedean spiral around the cable loom.

Likewise embraced by the concept of the invention is a jacketed elongate item, such as, in particular, a cable harness, jacketed with an adhesive tape of the invention, and also a vehicle comprising an elongate item thus jacketed.

In comparison to hoses and self-closing braided hoses which can be opened in the longitudinal direction, the longitudinal bandaging produced from the adhesive tape of the invention can be applied very easily around oval and flat forms of construction.

The adhesive tape of the invention may be applied in the customary and known operations in the context of cable bandaging.

The adhesive tape can be employed flexibly on different cable diameters.

The proper application of the adhesive tape can be verified simply and reliably by means of the advantageous marking.

The intention of the text below is to illustrate the invention in more detail using a number of figures, without wishing thereby to impose any unnecessary restriction on the invention.

Figure 4:
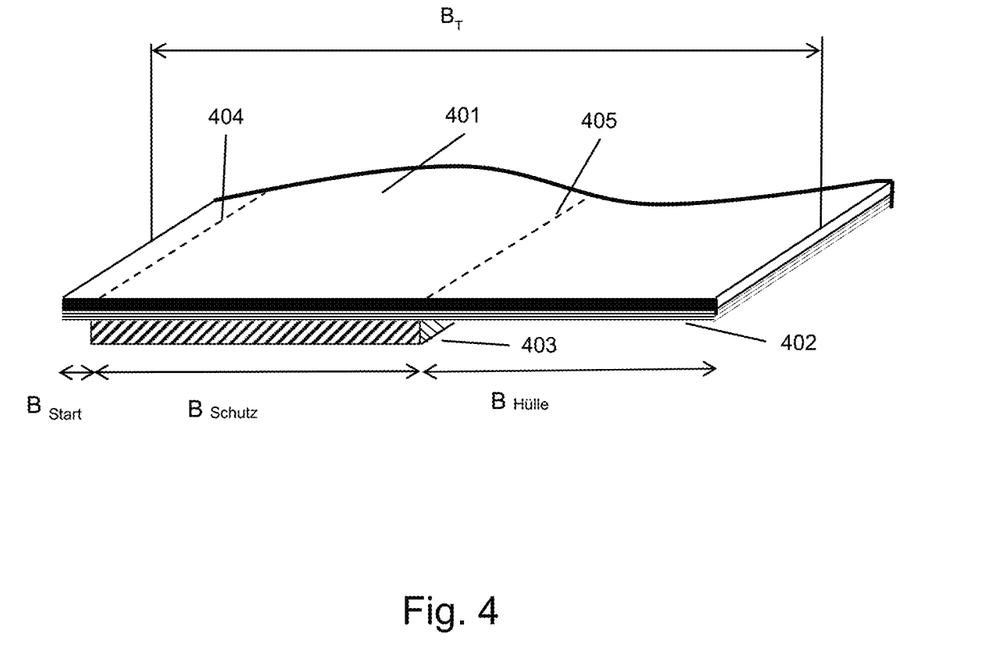
FIG. 4 shows the adhesive tape in a lateral section.

The adhesive tape according to FIG. 4 has a first carrier 401 made of woven fabric with a width $B_T$. On the topside of the first carrier 401 there are two marker lines (marker line start 404, marker line end 405) which are arranged above the long edges of the second carrier 403. Applied over the full area on the bottom side of the first carrier 401 is an adhesive 402. Applied below the adhesive 402 is the second carrier 403, which has a width $B_{Schutz}$ which is lower than that of the first carrier 401. The second carrier 403 leaves two adhesive stripes free on either side, with the respective widths $B_{start}$ and $B_{Hülle}$.

The first adhesive stripe is intended for preliminary securement; the second secures the adhesive tape after wrapping.

If, after the first wrapping, the marker line end 405 lies over the marker line 404, so that the latter is just no longer visible, the user knows that the second carrier 403 has looped the item once completely (360°), and therefore that the adhesive tape matches the diameter of the item to be jacketed (or the width of the second carrier 403 is ideally matched to the periphery of the item to be jacketed).

Figure 5:
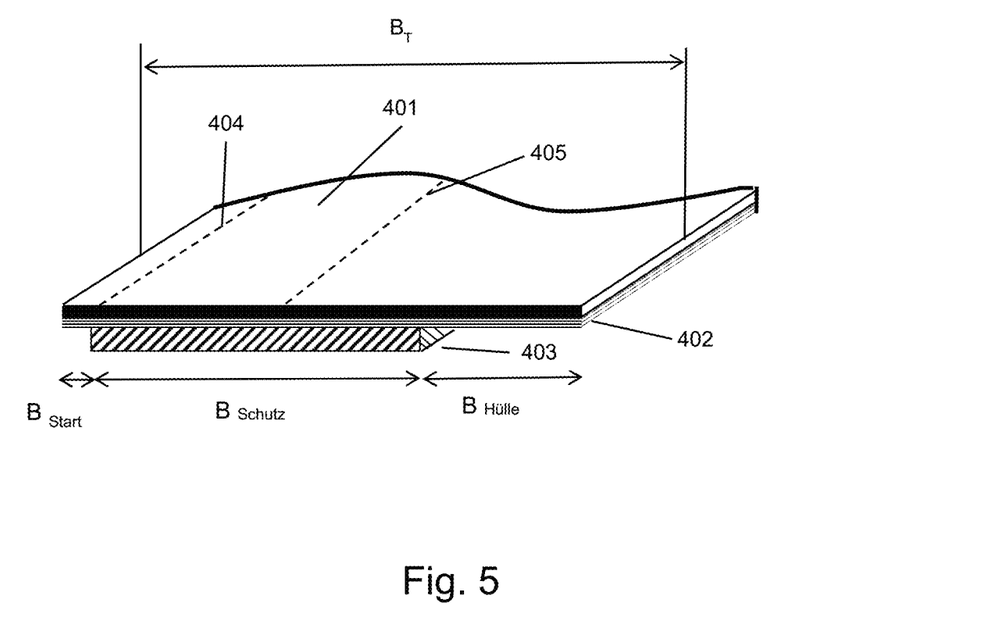
FIG. 5 shows the adhesive tape, in a somewhat different configuration, in a lateral section.

FIG. 5 shows an adhesive tape with a somewhat different configuration, in a lateral section. The marker line end 405 is offset to the centre of the second carrier 403. With regular wrapping, this means that the cable loom is initially wrapped once with the second carrier 403 (360°). Since at the same time the distance between the two marker lines 404, 405 corresponds to the width $B_{Hülle}$, the cable loom is ultimately wrapped once again by the first carrier 401 (360°). If the marker line end 405 is just no longer visible after wrapping, being masked by the end of the first carrier, the user knows that the adhesive tape is positioned optimally.

Figure 6:
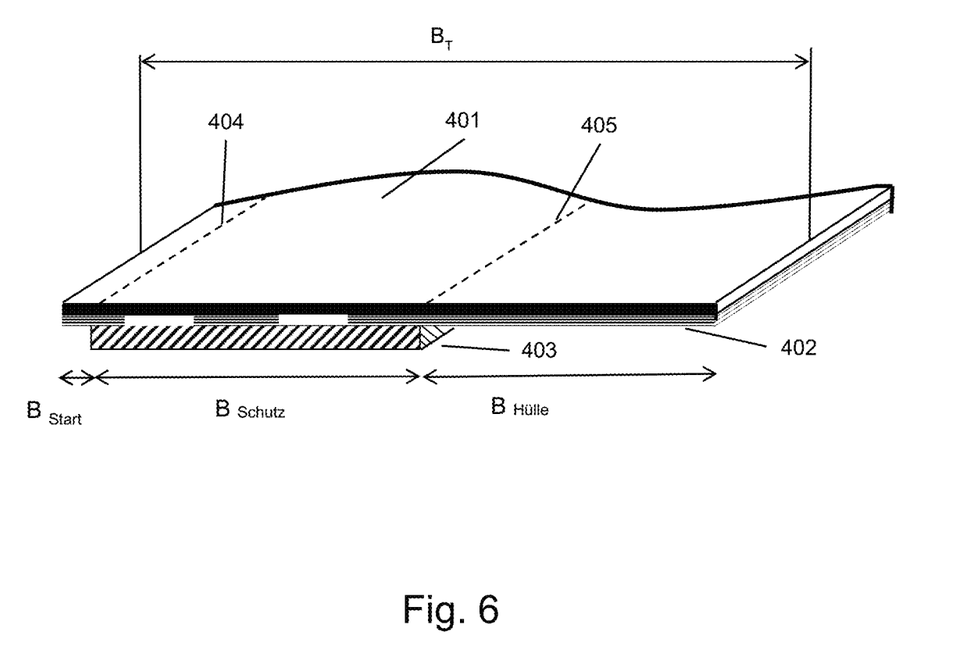
FIG. 6 shows a further variant of the adhesive tape in a lateral section.

FIG. 6 shows the adhesive tape according to FIG. 4, but with the layer 402 of adhesive not applied over the full area on the first carrier, but instead having two adhesive-free stripes, which are located above the second carrier 403. As a result the adhesive tape becomes more flexible.

Figure 7:
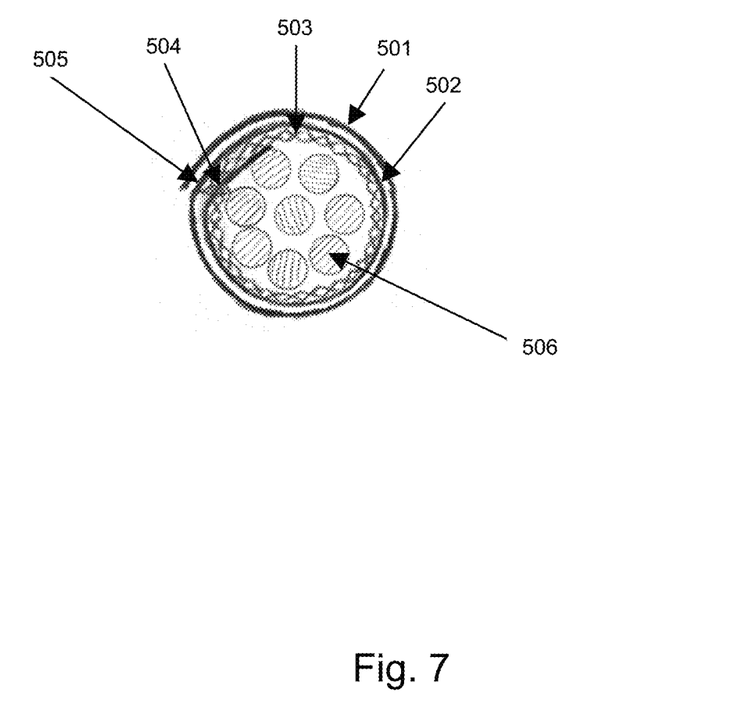
FIG. 7 shows a detail of a cable loom which is composed of a bundle of individual cables and is jacketed with the adhesive tape of the invention.

FIG. 7 shows the adhesive tape in another embodiment after the wrapping of various cables 506. The cables 506 are looped completely by one ply of second carrier 503 (360°), and in addition the first carrier 501 loops the cables 506 with a further complete rotation (360°) for the purpose of securement, so producing a surround which meets the requisite properties in relation in particular to the guillotine test.

EXAMPLES

Outline of the Examples

The adhesive tape of the invention is described below in a preferred embodiment by means of a number of examples A to G, without any intention thereby to subject the invention to any restriction whatsoever.

In addition, a comparative example V is given, which shows an unsuitable adhesive tape.

A woven polyethylene terephthalate fabric (fibre linear density 167 dtex, thread count warp 44/cm, thread count weft 25/cm) has an acrylate-based example PSA (pressure-sensitive adhesive) applied to it, to give an adhesive surface weight of 90 g/m$^2$.

Alternatively a woven polyamide fabric (fibre linear density 470 dtex, thread count warp 21/cm, thread count weft 21/cm) is used, and has an acrylate-based example PSA applied to it, with a coatweight of 95 g/m$^2$.

Various textiles are laminated to the adhesive as second carriers (also called protective textile plies).

The adhesive tapes are then subjected to the different measurement methods.

Polyamide density: 1140 g/dm$^3$ and
PET density: 1300 to 1400 g/dm$^3$

| Protective | Examples | | | |
|---|---|---|---|---|
| textile ply | A | B | C | D |
| Material class | PET | PET | PET | PET |
| Material type | Needlefelt | Needlefelt | Needlefelt | Double-ply woven fabric |
| Basis weight [g/m$^2$] | 400 | 600 | 800 | 630 |
| Thickness [µm] | 1680 | 2650 | 3450 | 1420 |
| Density [g/dm$^3$] | 238 | 226 | 231 | 443 |
| Abrasion 5 mm mandrel [double strokes] | 6525 | 25 460 | 57 200 | 8070 |
| Damping in [db(A)] | 15 | 16 | 18 | 4 |
| Combination of protective textile ply with woven PET fabric adhesive tape | | | | |
| Thickness [µm] | 1880 | 2840 | 3640 | 1630 |
| Abrasion 5 mm mandrel [double strokes] | 22 400 | 64 870 | 89 560 | 68 430 |
| Damping in [db(A)] | 14 | 15 | 17 | 4 |
| Drop tower test [J] | 25 | 25 | 50 | 50 |
| Flexural stiffness in application direction [mnN] | 461 | 889 | 1276 | 671 |
| Temperature class | 4 | 4 | 4 | 4 |

| Protective | Examples / Counter-example | | | |
|---|---|---|---|---|
| textile ply | E | F | V | G |
| Material class | PA 90 wt % PET 10 wt % | PET | PET | PA |
| Material type | Flat knit fabric | Formed-loop spacer knit | Nonwoven binder-consolidated | Flat knit fabric |
| Basis weight [g/m$^2$] | 875 | 523 | 696 | 260 |
| Thickness [µm] | 1450 | 2430 | 550 | 680 |
| Density [g/dm$^3$] | 605 | 215 | 1265 | 382 |
| Abrasion 5 mm mandrel [double strokes] | 22 980 | 12 788 | 86 400 | 4865 |
| Damping in [db(A)] | 8 | >20 | 2 | 6 |
| | Combination of protective textile ply with woven PET fabric adhesive tape | | | Combination of protective textile ply with woven PA fabric adhesive tape |

-continued

| | | | | |
|---|---|---|---|---|
| Thickness [µm] | 1660 | 2810 | 750 | 1160 |
| Abrasion 5 mm mandrel [double strokes] | 133 200 | 23 677 | 124 100 | 27 652 |
| Damping in [db(A)] | 8 | >20 | 2 | 7 |
| Drop tower test [J] | 25 | 50 | 5 | 50 |
| Flexural stiffness in application direction [nnN] | 316 | 712 | >2000 | 148 |
| Temperature class | 3 | 4 | 4 | 3 |

When the second carrier used is a binder-consolidated nonwoven, described for example in EP 995 783 A1, the result is a relatively stiff but hard adhesive tape, which the skilled person would have expected to be insensitive to impulsive events.

Surprisingly the opposite is the case.

Given a comparable thickness, adhesive tapes of this kind show much less protection against impulsive events—in the drop tower test, the surround produced with the adhesive tape suffers fractures at an exposure energy of just 5 J. After the fracture, the lead insulation of the cable may suffer damage.

Comparative example 1 does offer a high abrasion protection, but the drop tower test destroys the protective sleeve very quickly.

Needle-punched nonwovens (needlefelts) have a lower density by comparison with woven fabrics. The results in the drop tower test surprisingly show equally high values: with the same values for the protective effect, the protective surround can be produced with a lower weight of material. The high values in the drop tower test are likewise displayed by drawn-loop spacer knits, formed-loop spacer knits and flat knits.

Implementation of the Tests

Unless expressly stated otherwise, the measurements are carried out under test conditions of 23±1° C. and 50±5% relative humidity.

LIST OF REFERENCE NUMERALS

101 Sample holder
102 Steel mandrel
103 Test element, sample
104 Downholder, sample securement
105 Replaceable steel wire
106 Applied weight
107 Cyclical movement
108 Drive
201 Frame of test set-up
202 Aluminium impact plate
203 Movable round bar
204 Microphone
205 Test element, sample
301 Frame of test set-up
302 Drop weight
303 Drop tool T-profile
304 Test cable
305 Protective surround, sample
401 First carrier
402 Applied adhesive
403 Second carrier
404 Marker line start
405 Marker line end
501 First carrier
502 Applied adhesive
503 Second carrier
504 Marker line start
505 Marker line end
506 Cable

The invention claimed is:

1. An elongate item jacketed with an adhesive tape, wherein the adhesive tape comprises:
   a first carrier having a top side and a bottom side, wherein the first carrier, based on the cross direction, has a width $B_T$; and
   a layer of adhesive applied on the bottom side of the first carrier, the layer of adhesive bearing a second carrier, that has a lower width $B_{schutz}$ than the width $B_T$ of the first carrier, wherein first carrier with the layer of adhesive protrudes two-sidedly relative to side edges of the second carrier and has a first protrusion having a width of $B_{start}$ and a second protrusion having a width of $B_{Hülle}$,
   wherein
   the first carrier is a woven fabric,
   the second carrier is a textile carrier selected from the group of drawn-loop spacer knit, formed-loop spacer knit, woven double fabric, flat knit fabric and needle-punched nonwoven fabric,
   the first carrier has a basis weight of 50 g/m² to 200 g/m²,
   the second carrier has a basis weight of 300 to 1000 g/m², and
   and the elongate item is wrapped once with the second carrier and wrapped twice with the first carrier.

2. The elongate item of claim 1, wherein the adhesive tape consists of the first carrier, the layer of adhesive, and the second carrier.

3. A vehicle comprising the elongate item according to claim 1.

4. A method comprising:
   jacketing an elongate item with an adhesive tape such that the elongate item is enveloped in an axial direction by the adhesive tape,
   wherein
   the adhesive tape comprises:
   a first carrier having a top side and a bottom side, wherein the first carrier, based on the cross direction, has a width $B_T$; and
   a layer of adhesive applied on the bottom side of the first carrier, the layer of adhesive bearing a second carrier, that has a lower width $B_{schutz}$ than the width $B_T$ of the first carrier, wherein first carrier with the layer of adhesive protrudes two-sidedly relative to side edges of the second carrier and has a first protrusion having a width of $B_{start}$ and a second protrusion having a width of $B_{Hülle}$,
   wherein
   the first carrier is a woven fabric,
   the second carrier is a textile carrier selected from the group of drawn-loop spacer knit, formed-loop spacer knit, woven double fabric, flat knit fabric and needle-punched nonwoven fabric,
   the first carrier has a basis weight of 50 g/m² to 200 g/m²,
   the second carrier has a basis weight of 300 to 1000 g/m², and and the elongate item is wrapped once with the second carrier and wrapped twice with the first carrier.

5. The method of claim 4, wherein at least one marker line extending in longitudinal direction on the top side of the first carrier is arranged above longitudinal edges of the second carrier.

6. The method of claim 4, wherein
$B_{start}$ has a width of 3 to 20 mm,
$B_{schutz}$ has a width of 50 to 200 mm or a width of 100 to 400 mm, if the item is to be wrapped with two plies, and/or
$B_{Hülle}$ has a width of 50 to 200 mm.

7. The method of claim 4, wherein construction of the woven fabric is as follows:
the warp thread count is 10 to 60/cm;
the weft thread count is 10 to 40/cm;
the warp threads possess a yarn weight between 40 and 500 dtex; and
the weft threads possess a yarn weight between 40 and 660 dtex.

8. The method of claim 4, wherein the first carrier has a colouration.

9. The method of claim 4, wherein the adhesive coatweight, based on the carrier area, is between 40 and 160 $g/m^2$.

10. The method of claim 4, wherein a thickness of the second carrier is not more than 4000 µm and/or the second carrier has a basis weight of 350 $g/m^2$ to 850 $g/m^2$.

11. The method of claim 4, wherein a needle-punched nonwoven is used as the second carrier.

12. The method of claim 4, wherein an acrylate-based adhesive is used as the adhesive.

13. The method of claim 4, wherein the adhesive tape consists of the first carrier, the layer of adhesive, and the second carrier.

* * * * *